United States Patent [19]
Toyomoto

[11] Patent Number: 5,096,345
[45] Date of Patent: Mar. 17, 1992

[54] BALANCEABLE HOLDER FOR MACHINE TOOLS

[76] Inventor: Hironobu Toyomoto, 17813 S. Main St., Unit 114, Gardena, Calif. 90248

[21] Appl. No.: 686,989

[22] Filed: Apr. 18, 1991

[51] Int. Cl.⁵ .................. B23B 51/00; B23C 5/16
[52] U.S. Cl. .................. 408/239 R; 279/1 C; 279/1 J; 279/1 ME; 409/234; 51/169; 74/573 R; 407/30; 407/120
[58] Field of Search .................. 279/1 C, 1 J, 1 ME; 407/30, 120; 408/238, 239 R, 239 A; 74/573 R; 51/169; 82/903; 409/232, 234

[56] References Cited

U.S. PATENT DOCUMENTS

| | | | |
|---|---|---|---|
| 4,697,489 | 10/1987 | Klee et al. | 279/1 C X |
| 5,033,923 | 7/1991 | Osawa | 279/1 C X |

*Primary Examiner*—Steven C. Bishop
*Attorney, Agent, or Firm*—Marks Murase & White

[57] ABSTRACT

A balanceable tool holder for machine tools includes a main body with a holding cylinder. In addition, a flange encircles the main body. A plurality of screw holes extend longitudinally in the main body in which adjusting screws are moveable inwardly and outwardly for adjusting the balance of the tool holder.

4 Claims, 1 Drawing Sheet

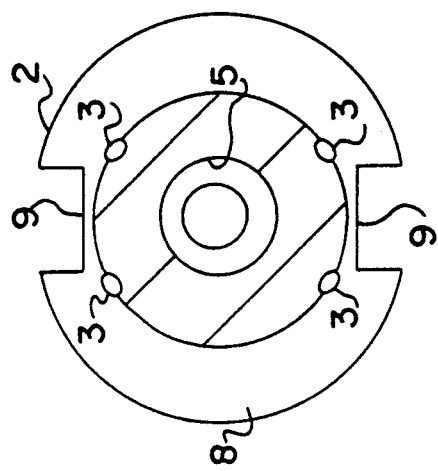
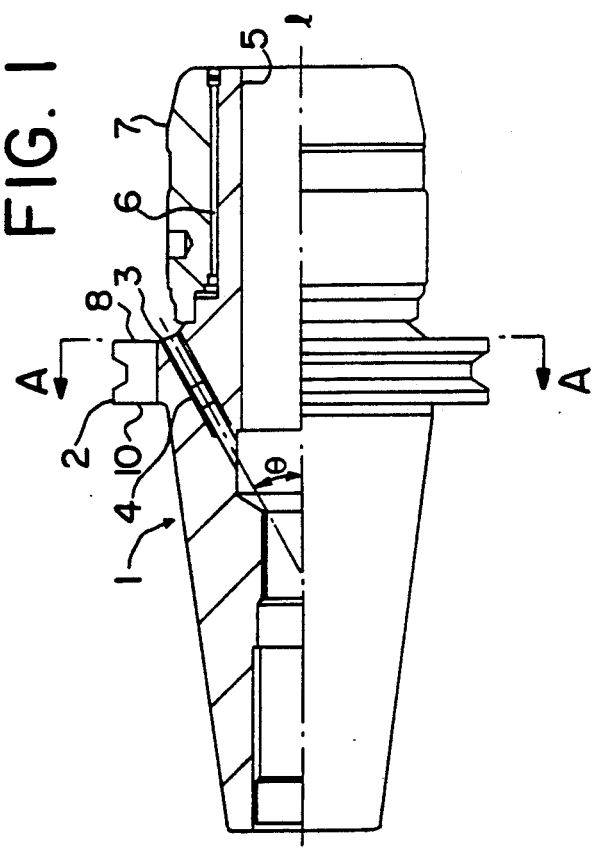
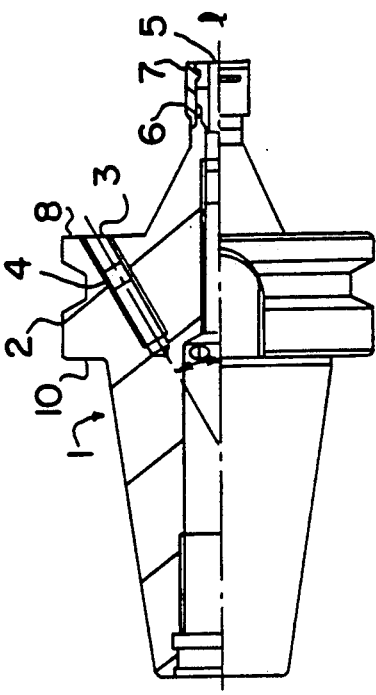
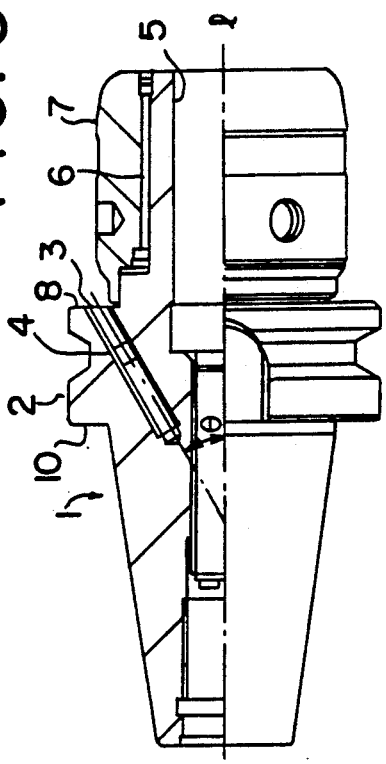

BALANCEABLE HOLDER FOR MACHINE TOOLS

FIELD OF THE INVENTION

The present invention relates generally to holders for tools and, specifically, to a balanceable tool holder for use with machine tools.

BACKGROUND OF THE INVENTION

Recent machine tools, such as for example those manufactured by Machining Center or NC, have progressed to the state where very high speeds of operation are utilized in which a blade sometimes rotates over 30,000 r.p.m. In such machine tools, if the blade and its holder are not balanced or are even slightly unbalanced, deflection increases during high speed machining, which adversely affects machining accuracy. In the past, the balance of the tool holder was commonly adjusted by drilling a hole on the higher side of the mass. In this way, although unbalancing of the tool holder itself could be eliminated, such attempts were unsuccessful in adjusting unbalance caused by attaching a blade like collet, drill, end-mill, tap or the like to the tool holder.

In order to solve the above problem, a tap-process is applied with a certain pitch from the outer circle of the flange provided on the main body of the tool holder toward the center of the holder and then, hollow sets are inserted at unbalanced points. However, difficulties were encountered in adjusting all of the unbalance. Therefore, such attempts were inadequate in adjusting a balance grade smaller than 2.5G, which is required in connection with tool holders rotatable over 30,000 r.p.m., a trend of the latest machine tools.

Thus, there has been a need for a balanceable tool holder for machine tools, which would eliminate the problems and limitations associated with the prior devices discussed above, most significant of the problems being the need to balance the tool holder even when blade like collets, drills, end-mills, taps or the like are used in connection with the tooling holder at high speed r.p.m. These and other objects will be apparent from the following detailed description and appended claims.

SUMMARY OF THE INVENTION

In contrast to the prior devices discussed above, it has been found that a balanceable tool holder for machine tools has a plurality of screw holes slanted at an acute angle on or around the flange on the main body of the holder, in which screws may be movably adjusted to balance the tool holder and tool to eliminate the prior problems and limitations.

The balanceable tool holder for machine tools of the present invention includes at least one screw hole extending into a holder body portion at a slanting angle and screw means movable inwardly and outwardly of the holder body portion within said screw hole for adjusting balancing.

In the preferred embodiment of the present invention, the screw means is adapted to include an adjusting screw. In addition, the tool holder further includes a flange extending around the holder body portion. Further, the flange includes a cut-off part.

BRIEF DESCRIPTION OF DRAWINGS

The various features, objects, benefits, and advantages of the present invention will become more apparent upon reading the following detailed description of the preferred embodiment along with the appended claims in conjunction with the drawing, wherein like reference numerals identify corresponding components, and:

FIG. 1 is a partially cross-sectional side view of one example of the balanceable tool holder of the present invention;

FIG. 2 is a partially cross-sectional side view taken along line A—A of FIG. 1;

FIG. 3 is a partially cross-sectional side view of another embodiment of the present invention; and FIG. 4 is a partially cross-sectional side view of yet another embodiment of the present invention.

DETAILED DESCRIPTION OF THE PREFERRED EMBODIMENTS

The balanceable tool holder of the present invention for machine tools is illustrated in FIGS. 1-4.

FIGS. 1 and 2 show an example of the balanceable tool holder of the present invention including a main body 1 and a holding ring 7. The main body 1 includes a first end and a second end with a longitudinal axis extending between the first end and the second end. A holding cylinder 6 includes an attaching hole 5 for a blade or the like extending inwardly in the horizontal direction along the longitudinal axis which is encircled by the holding ring 7. About the middle of the main body 1 of the tool holder on the base part or portion and adjacent the holding cylinder 6, flange 2 in brim shape sticks or protrudes outwardly.

The flange 2 includes two cut-off parts 9 positioned symmetrically about the flange. Adjacent the cut-off parts 9 on the main body 1 are preferably four screw holes 3 bored toward a slanted direction or angle. The screw holes 3 are slanted to form an acute angle $\theta$ with the longitudinal axis of the main body against the blade attaching hole 5. The screw holes 3 are bored into the main body 1 toward the second end. To these screw holes, adjusting screws 4 which are nylons locked are attached for movable adjustment within the screw holes 3.

The tool holder of the present invention may be attached with a blade like collet and installed on balancing equipment (not shown) and rotated. In this way, the balance of the tool holder with the blade can be adjusted by moving the adjusting screws 4 inwardly or outwardly in the screw holes 3.

In this way, the adjusting screws on the lower side of the mass of the main body may be screwed outwardly and then fixed and the adjusting screws on the higher side of the mass may be screwed in and then fixed. In this way, the balance of the tool holder can be adjusted both vertically and horizontally. Because the adjusting screws are screwed in slanted holes, they will not be moved by centrifugal force of rotation during high speed rotation.

FIGS. 3 and 4 show other examples of preferred embodiments of the present invention. Both tool holders include several screw holes 3 bored slantedly in which movable adjusting screws 4 may be inserted as with the other embodiment. However, the difference from the embodiment shown in FIG. 1 resides in that the plurality of screw holes 3 in the tool holders shown in FIGS. 3 and 4 are bored from a lower side 8 of the flange 2 toward the center of the tool holder at an acute angle $\theta$.

The examples of FIGS. 1-4 show that by simply having slanted screw holes 3 on an existing tool holder, the tool holder can attach balance-adjusting screws 4 which will enable highly accurate balance adjustment of the tool holder.

This idea is not limited to the above examples. Within the scope of intent of the present invention, you can alter your design. For example, the slant screw holes can be bored from an upper side 10 of the flange 2 in a direction toward a top or the second end of the holder main body 1.

As the idea is composed as stated, it has a great deal of practical effects, including the following:

(1) Unbalance, including in both the horizontal and vertical direction, during rotation at high speeds over 30,000 r.p.m. can be corrected to a high degree of accuracy for utilization in high speed rotation machine tools, (2) Balance can be gained easily just by moving the adjusting screws 4 either inwardly or outwardly.

(3) The slant screw holes 3 can be made in an adequate length and number.

(4) Adjustment movement of an adjusting screw 4 is larger so that better fine adjustment can be obtained.

While the preferred embodiments of the present invention have been described so as to enable one skilled in the art to practice the balanceable tool holder of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. A balanceable tool holder for use in machine tools and the like comprising:
   at least one screw hole extending into a holder body portion at a slanting angel; and
   screw means movable inwardly and outwardly of the holder body portion within said screw hole for adjusting balancing.

2. The balanceable tool holder defined in claim 1, wherein said screw means is adapted to include an adjusting screw.

3. The balanceable tool holder defined in claim 1, further comprising a flange extending around the holder body portion.

4. The balanceable tool holder defined in claim 3, wherein said flange includes a cut-off part.

* * * * *